(12) United States Patent
Miyazaki (10) Patent No.: US 8,941,754 B2
(45) Date of Patent: Jan. 27, 2015

(54) IMAGE CAPTURE APPARATUS AND CONTROL METHOD THEREOF

(75) Inventor: Yasuyoshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 13/596,591

(22) Filed: Aug. 28, 2012

(65) Prior Publication Data

US 2013/0063618 A1 Mar. 14, 2013

(30) Foreign Application Priority Data

Sep. 9, 2011 (JP) ................................. 2011-197684

(51) Int. Cl.
H04N 5/228 (2006.01)
H04N 5/235 (2006.01)
H04N 5/222 (2006.01)

(52) U.S. Cl.
CPC ................................... *H04N 5/2354* (2013.01)
USPC ....................... 348/222.1; 348/221.1; 348/370

(58) Field of Classification Search
USPC .............................................. 348/222.1, 370
See application file for complete search history.

(56) References Cited

U.S. PATENT DOCUMENTS

| 7,825,955 | B2 * | 11/2010 | Kato | 348/221.1 |
| 8,570,394 | B1 * | 10/2013 | Maeng | 348/222.1 |
| 2007/0047945 | A1 | 3/2007 | Nose et al. | |
| 2012/0105668 | A1 * | 5/2012 | Velarde et al. | 348/223.1 |
| 2013/0015946 | A1 * | 1/2013 | Lau et al. | 340/5.2 |

FOREIGN PATENT DOCUMENTS

| CN | 1624562 A | 6/2005 |
| JP | 2007-318673 A | 12/2007 |

* cited by examiner

*Primary Examiner* — Trung Diep
(74) *Attorney, Agent, or Firm* — Carter, DeLuca, Farrell & Schmidt, LLP (57) ABSTRACT

An image capture apparatus comprises an image capture unit which captures an object image, a compensation unit which performs exposure compensation corresponding to a shooting scene when a display unit sequentially displays images based on image data obtained by continuously capturing images by the image capture unit, an illumination control unit which controls an illumination device for illuminating an object, and a control unit which, in turning on the illumination device which is OFF when the compensation unit performs exposure compensation and the display unit sequentially displays images based on image data obtained by continuously capturing images by the image capture unit, controls to decrease a compensation amount of exposure compensation by the compensation unit and then turn on the illumination device.

13 Claims, 8 Drawing Sheets

FIG. 1

FIG. 3A  PERSON IN DARK NIGHT SCENE

FIG. 3B  EXPOSURE COMPENSATION TO MAKE PERSON BRIGHT IN LIVE VIEW

FIG. 3C  ON DETERMINATION CANCELATION OF EXPOSURE COMPENSATION PROCESSING

FIG. 3D  VIDEO LIGHT ON BECAUSE OF DARK PLACE

FIG. 3E  ABRUPT CONVERGENCE OF LUMINANCE

FIG. 3F  START OF RECORDING WITH MOVING IMAGE BUTTON

FIG. 4A — PERSON IN DARK NIGHT SCENE

FIG. 4B — EXPOSURE COMPENSATION TO MAKE PERSON BRIGHT IN LIVE VIEW

FIG. 4C — START OF RECORDING WITH MOVING IMAGE BUTTON VIDEO LIGHT ON BECAUSE OF DARK PLACE

FIG. 4D — HIGHLIGHT SATURATION AND CONVERGENCE ARE RECORDED IMMEDIATELY AFTER LIGHT ON, AND MOVING IMAGE QUALITY BECOMES POOR.

FIG. 7A — PERSON IN DARK NIGHT SCENE THIS MEETS ON CONDITION IN CASE OF DARK.

FIG. 7B — HIGHLIGHT SATURATION UPON LIGHT ON THIS MEETS OFF CONDITION DUE TO HIGHLIGHT SATURATION.

FIG. 7C — PERSON IN DARK NIGHT SCENE THIS MEETS ON CONDITION IN CASE OF DARK.

FIG. 7D — HIGHLIGHT SATURATION UPON LIGHT ON THIS MEETS OFF CONDITION DUE TO HIGHLIGHT SATURATION.

F I G. 8A

PERSON IN DARK
NIGHT SCENE
THIS MEETS ON
CONDITION IN CASE
OF DARK.

F I G. 8B

HIGHLIGHT
SATURATION UPON
LIGHT ON
OFF CONDITION IS
CHANGED BASED ON
CONVERGENT LUMINANCE
UPON LIGHT ON.

F I G. 8C

PERSON IN DARK
NIGHT SCENE, BUT
PROPER OBJECT
HUNTING IS PREVENTED.

IMAGE CAPTURE APPARATUS AND CONTROL METHOD THEREOF

BACKGROUND OF THE INVENTION

1. Field of the Invention

The present invention relates to ON/OFF control of a video light in an image capture apparatus.

2. Description of the Related Art

Conventionally, in still image shooting of a dark scene such as a night scene, both the background and object can be shot by emitting light from a light-emitting device such as an electronic flash to increase the object's illuminance. The electronic flash has high illuminance, but emits a flash and is not effective when an object always needs to be illuminated, as in moving image shooting. To simultaneously shoot both the background and object in moving image shooting, there is an image capture apparatus which turns on a video light to increase the object illuminance, and shoots the object. For example, Japanese Patent Laid-Open No. 2007-318673 discloses a sensor camera which determines an ambient brightness, and when the brightness is equal to or lower than a predetermined value, turns on an illumination means and controls the light quantity of the illumination means.

Figure 4A:
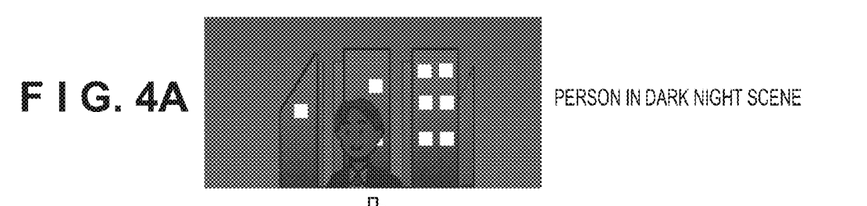
FIGS. 4A to 4E are views showing a problem in a conventional technique.
Figure 4B:
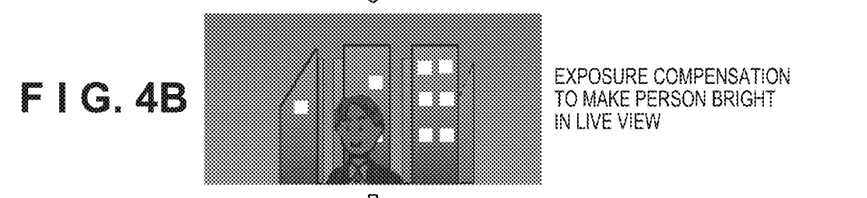
Figure 4C:
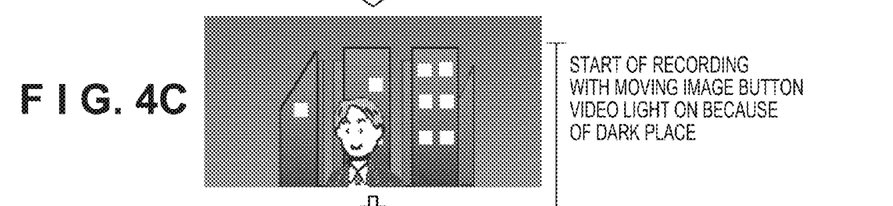
Figure 4D:
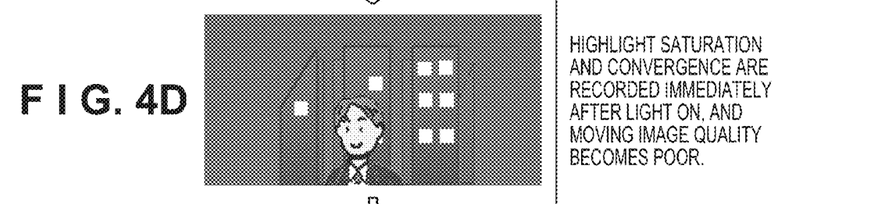
Figure 4E:
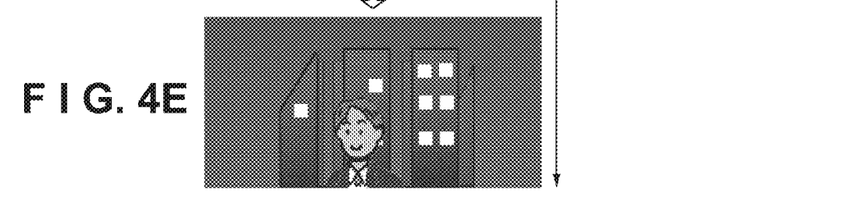

However, when the ambient brightness is determined to control the light quantity of the illumination means, like the camera disclosed in Japanese Patent Laid-Open No. 2007-318673, convergence of the luminance along with exposure variations upon light ON may be recorded, degrading the moving image quality. This may occur when, for example, automatic control of the illumination means is executed at the same time as moving image recording in a camera capable of moving image recording with one button from the still image mode. This state will be explained with reference to FIGS. 4A to 4E. In the still image mode, the display unit displays a so-called live view image which is an image periodically captured by an image sensor. As the live view image, the display unit displays an image for which the exposure is compensated so that a person can be easily seen even in a night scene in which he exists in a dark environment, as shown in FIG. 4A. When the start of moving image recording is designated in the exposure-compensated state, the illumination means emits light in correspondence with an ambient brightness upon the start of moving image recording. However, if exposure compensation is maintained to make the live view image bright, the person becomes brighter than necessary, as shown in FIG. 4C. After that, the exposure is converged to optimize the luminance of the excessively bright person. Such exposure variations occur after the start of moving image recording is designated. Thus, all the states in FIGS. 4C to 4E are recorded as a moving image, degrading the moving image quality.

SUMMARY OF THE INVENTION

The present invention has been designed to solve the above problems, and prevents degradation of the moving image quality upon the ON operation of an illumination light when shooting a moving image.

According to a first aspect of the present invention, there is provided an image capture apparatus comprising: an image capture unit which captures an object image; a compensation unit which performs exposure compensation corresponding to a shooting scene when a display unit sequentially displays images based on image data obtained by continuously capturing images by the image capture unit; an illumination control unit which controls an illumination device for illuminating an object; and a control unit which, in turning on the illumination device which is OFF when the compensation unit performs exposure compensation and the display unit sequentially displays images based on image data obtained by continuously capturing images by the image capture unit, controls to decrease a compensation amount of exposure compensation by the compensation unit and then turn on the illumination device.

According to a second aspect of the present invention, there is provided a method of controlling an image capture apparatus including an image capture unit which captures an object image, a compensation unit which performs exposure compensation corresponding to a shooting scene when a display unit sequentially displays images based on image data obtained by continuously capturing images by the image capture unit, and an illumination control unit which controls an illumination device for illuminating an object, comprising: in turning on the illumination device which is OFF when the compensation unit performs exposure compensation and the display unit sequentially displays images based on image data obtained by continuously capturing images by the image capture unit, controlling to decrease a compensation amount of exposure compensation by the compensation unit and then turn on the illumination device.

Further features of the present invention will become apparent from the following description of exemplary embodiments with reference to the attached drawings.

BRIEF DESCRIPTION OF THE DRAWINGS

FIGS. 7A to 7D are views showing hunting upon light ON; and

DESCRIPTION OF THE EMBODIMENTS

Figure 1:
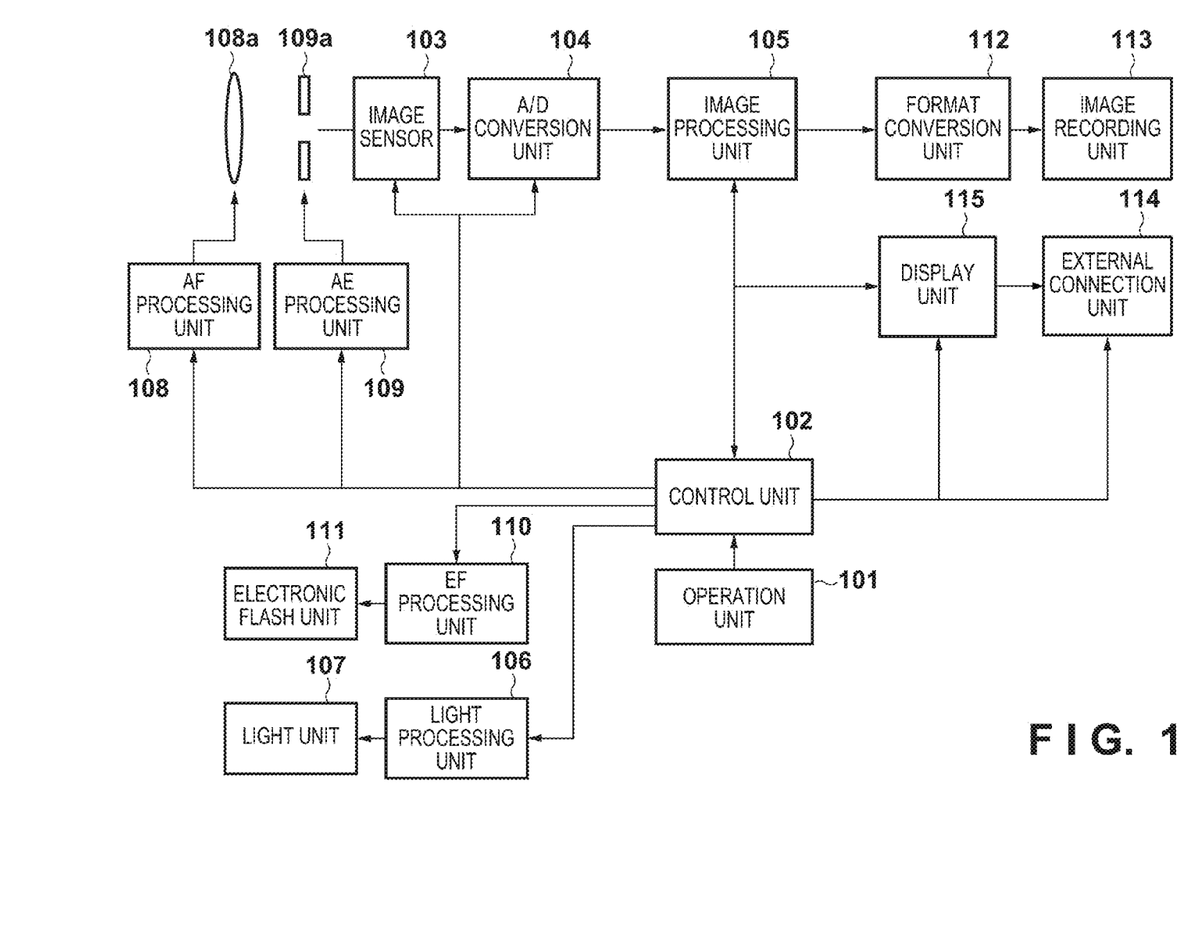
FIG. 1 is a block diagram showing an image capture apparatus according to an embodiment of the present invention.

An embodiment of the present invention will now be described in detail with reference to the accompanying drawings. FIG. 1 is a block diagram showing the functional arrangement of a digital camera serving as an embodiment of an image capture apparatus according to the present invention.

An operation unit 101 includes switches, buttons, and the like which are operated by the operator of the digital camera in the embodiment to input various instructions to the digital camera. The operation unit 101 includes a shutter switch and a touch sensor (which enables an operation by touching the display device).

A control unit 102 controls the operations of respective units shown in FIG. 1, and controls the respective units in accordance with an instruction from the operation unit 101. An image sensor 103 captures an object image. The image sensor 103 receives light having passed through a lens 108a and exposure mechanism 109a, and outputs a signal corresponding to the light quantity.

An A/D conversion unit 104 performs sampling, gain adjustment, A/D conversion, and the like for an analog image signal output from the image sensor 103, and outputs a digital image signal. An image processing unit 105 performs various image processes for the digital image signal output from the A/D conversion unit 104, and outputs the processed digital image signal. For example, the image processing unit 105 converts a digital image signal received from the A/D conversion unit 104 into a YUV image signal, and outputs the YUV image signal.

A light processing unit 106 performs illumination control of a light unit 107 (to be described later) in accordance with an instruction from the control unit 102. Note that the following embodiment will explain a case in which the control unit 102 makes an ON/OFF determination (illumination determination) of the light unit 107. However, the light processing unit 106 may receive information from the control unit 102 to make an ON/OFF determination (illumination determination) of the light unit 107. The light unit 107 includes a light source (to be referred to as a light hereinafter) capable of long-term continuous light emission, such as an LED. The light unit 107 receives an instruction from the light processing unit 106 to turn on/off the light. An EF processing unit 110 calculates the light emission quantity of an electronic flash unit 111 and controls light emission of the electronic flash unit 111. The electronic flash unit 111 includes a light source (to be referred to as an electronic flash hereinafter) capable of emitting a flash. The electronic flash unit 111 receives a light emission instruction from the EF processing unit 110 and emits a flash.

An AF processing unit 108 adjusts the focus by driving the lens 108a in accordance with an instruction from the control unit 102.

An AE processing unit 109 controls the exposure by driving the exposure mechanism 109a in accordance with an instruction from the control unit 102. Note that the AE processing unit 109 controls the exposure by controlling the shutter speed (charge accumulation time) of the image sensor, the gain (shooting sensitivity) of the A/D conversion unit 104, and the like in accordance with an instruction from the control unit 102.

A display unit 115 forms a display screen from a liquid crystal, organic EL, or the like, and displays set exposure information, a current live view image, and the like. Note that the live view image is an image when the display unit 115 sequentially displays images based on image data obtained by continuously capturing images by the image sensor 103. A state in which the display unit 115 sequentially displays images based on image data obtained by continuously capturing images by the image sensor 103 will be referred to as "during live view image display". A format conversion unit 112 converts the format of a digital image signal (image data) output from the image processing unit 105 into a format such as JPEG, and outputs the converted digital image signal to an image recording unit 113. The image recording unit 113 performs processing of recording format-converted image data received from the format conversion unit 112 on the internal memory (not shown) of the digital camera, an external memory inserted into the digital camera, or the like.

An external connection unit 114 is used to connect an external device, and can transmit image data to a connected external device. By transmitting image data to an external display device connected via the external connection unit 114, the external display device can also display a live view image.

An operation when capturing an image using the digital camera according to the embodiment will be explained with reference to FIGS. 2 and 3A to 3F.

<Processing Sequence>

When the operator of the digital camera turns on a power switch included in the operation unit 101, the control unit 102 detects this and supplies power to the respective building units of the digital camera. Then, the flowchart shown in FIG. 2 starts. When the respective building units of the digital camera are powered, the shutter opens, and the image sensor 103 receives light via the lens 108a and exposure mechanism 109a. That is, a live image is exposed (step S201). Charges accumulated in the image sensor upon exposure are read out and output as an analog image signal to the A/D conversion unit 104 (step S202).

Figure 2:
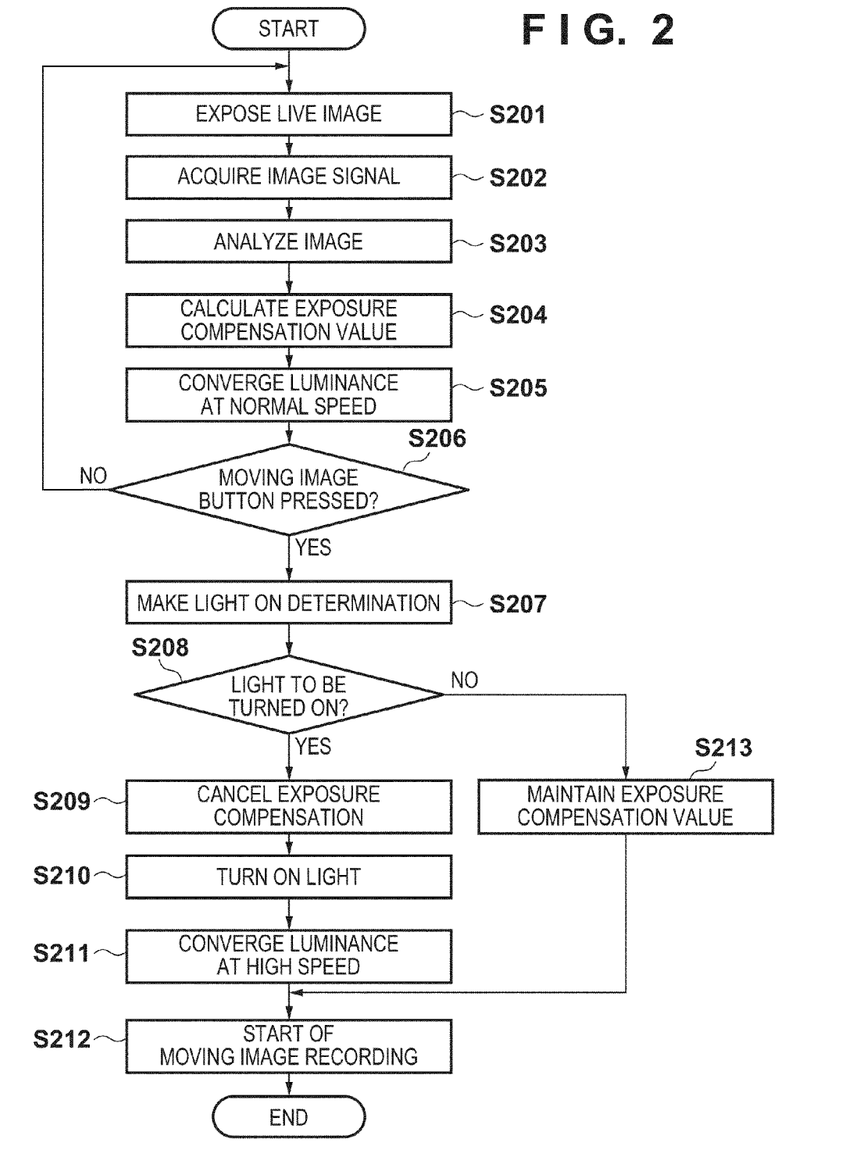
FIG. 2 is a flowchart showing the operation of the image capture apparatus according to the embodiment.

The A/D conversion unit 104 performs sampling, gain adjustment, A/D conversion, and the like for the analog image signal output from the image sensor 103, and outputs a digital image signal. The image processing unit 105 performs various image processes for the digital image signal output from the A/D conversion unit 104, and outputs the processed digital image signal. In this case, block division processing is parallelly executed for image analysis, obtaining hues, chromas, and luminances in the respective blocks (step S203).

Figure 3A:
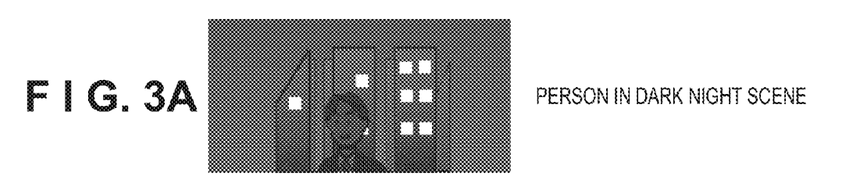
FIGS. 3A to 3F are views showing an effect in the embodiment of the present invention.
Figure 3B:
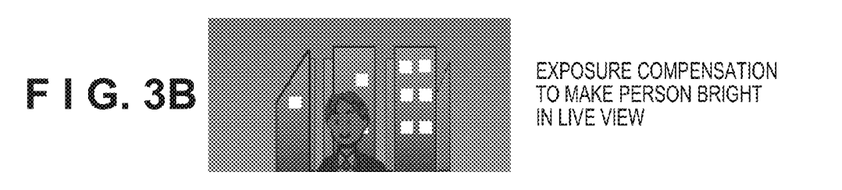

The obtained luminances of the respective blocks are transferred to the control unit 102. The control unit 102 calculates the weighted average of the luminances of the respective blocks using weights determined based on a predetermined condition, acquiring a Bv value serving as a luminance value within the frame. The control unit 102 calculates an exposure control value based on the acquired Bv value. For a shooting scene in which a person exists in a night scene of a dark environment, as shown in FIG. 3A, an exposure compensation value for compensating for an exposure control value is also calculated so that the person can be easily seen, as shown in FIG. 3B (step S204). That is, in step S204, the control unit 102 executes exposure compensation corresponding to a shooting scene. The AE processing unit 109 controls the exposure based on an exposure control value reflecting the exposure compensation value, and converges the object luminance value to a desired luminance value (step S205). Steps S201 to S205 are always executed in feedback processing. After that, the control unit 102 determines whether a moving image button has been pressed (step S206).

If the moving image button has been pressed in this state, the control unit 102 makes a light ON/OFF determination based on the Bv value acquired in step S204 (step S207). Note that the light ON/OFF determination will be described later.

Figure 3C:
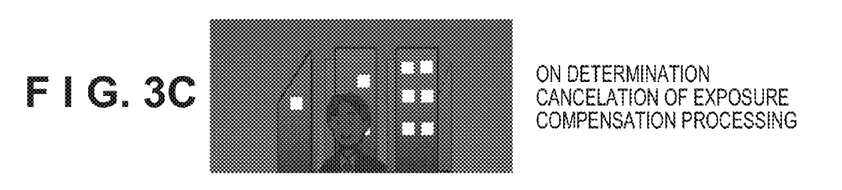
Figure 3D:
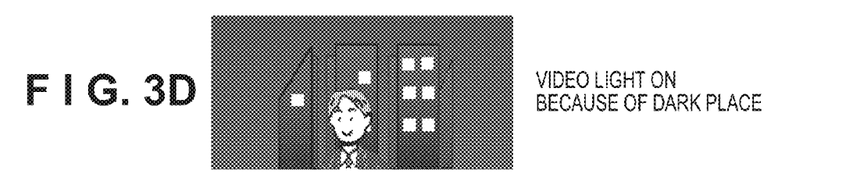

If the control unit 102 determines to turn on the light, it instructs the AE processing unit 109 not to reflect the exposure compensation value which has been reflected so far. Upon receiving the instruction from the control unit 102, the AE processing unit 109 cancels exposure compensation processing and controls the exposure, as shown in FIG. 3C (step S209). After canceling exposure compensation processing, the control unit 102 instructs the light processing unit 106 to turn on the light. Upon receiving the instruction from the control unit 102, the light processing unit 106 turns on the light, as shown in FIG. 3D (step S210). The luminance is converged to a desired luminance value by controlling the exposure based on the luminance value of image data acquired by executing exposure in a state in which exposure compensation processing has been canceled and the light is ON (step S211).

Figure 3E:
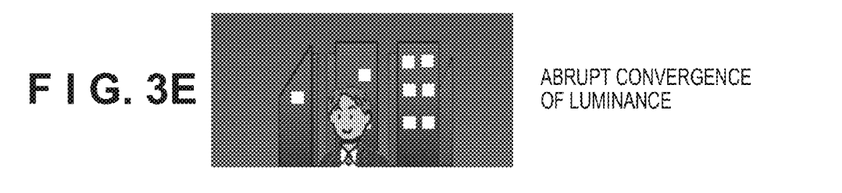
Figure 3F:
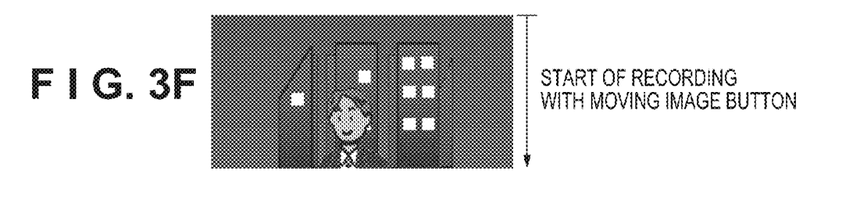

At this time, the convergence speed is set different from that used when the luminance is converged to a desired luminance value in step S205. In step S205, the luminance value is converged during live view image display (to be also referred to as "during live view" hereinafter) before shooting. The convergence speed is set so that flickers of the live view image hardly stand out. This is because, if the luminance value is converged abruptly, the luminance greatly changes between live view images. As will be described later, in step S212, moving image recording starts after the luminance value converges in step S211. In step S211, priority is given to shortening the time until moving image recording starts after the moving image button is pressed. Thus, the luminance value convergence speed is set higher than that in step S205, as shown in FIG. 3E. When the exposure varies during moving image recording, the convergence speed is set to make flickers less conspicuous, as during live view in the still image mode. The convergence speed in step S211 is therefore higher than that during moving image recording. The control unit 102 starts moving image recording in a state in which the luminance value becomes stable, as shown in FIG. 3F (step S212). At this time, the control unit 102 determines, based on image data, whether the luminance value is stable. Alternatively, moving image recording may start upon the lapse of a time set on the premise of the time taken to stabilize a luminance value from one immediately after light ON.

Then, various image processes are performed for a moving image obtained upon convergence and exposure, outputting a processed digital image signal. The format conversion unit 112 converts the format of the digital image signal (image data) output from the image processing unit 105 into a format such as MPEG, and outputs the format-converted image data to the image recording unit 113. The image recording unit 113 performs processing of recording the format-converted image data on a predetermined memory.

In the above processing, exposure compensation processing is canceled (not to perform exposure compensation) and then the light is turned on. It is also possible to decrease the compensation amount of exposure compensation and then turn on the light.

Figure 5:
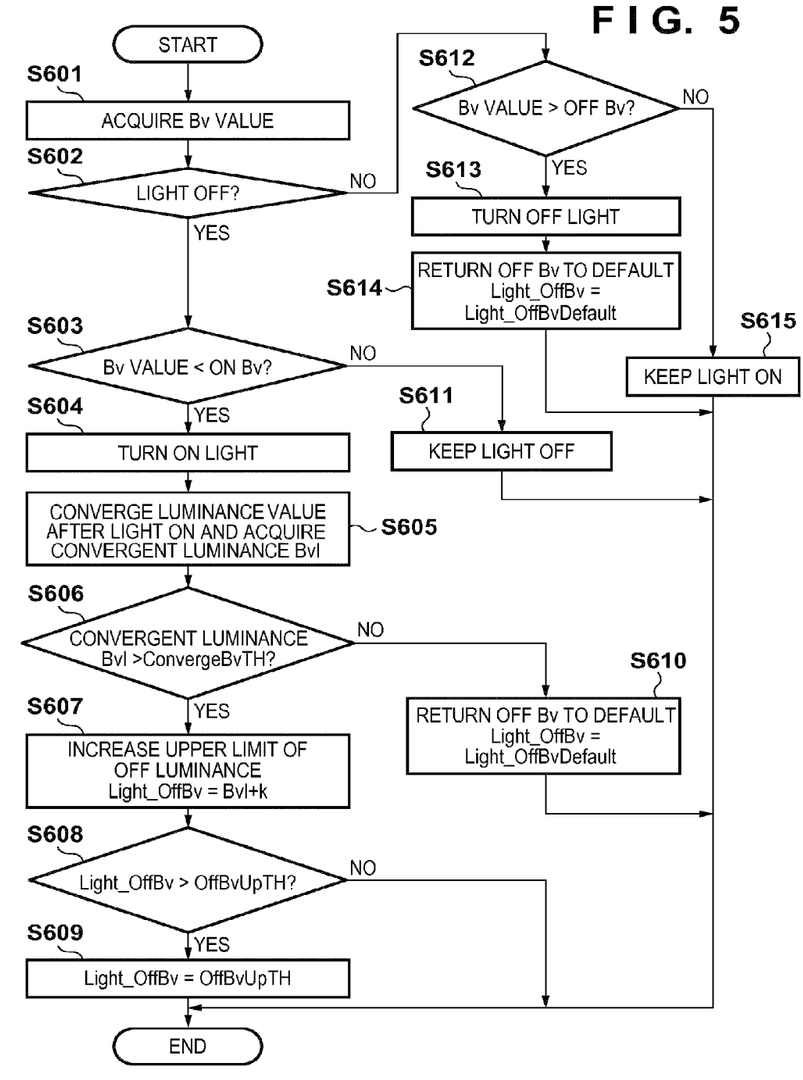
FIG. 5 is a flowchart showing light ON and OFF operations.

The light ON/OFF determination in step S207 will be explained. FIG. 5 is a flowchart showing light ON/OFF control.

In FIG. 5, first, a Bv value representing a luminance value within the frame is acquired (step S601). The Bv value is calculated in step S204. It is determined whether the light is OFF now (step S602). If the light is OFF and the acquired Bv value is equal to or larger than a light ON Bv value, it is determined to maintain the OFF state (step S611). If the Bv value is smaller than a light ON Bv value, it is determined to turn on the light (step S604). The processing up to this step corresponds to the light ON/OFF determination in step S207.

The following description includes even a light ON/OFF determination in another situation.

After the light is turned on in accordance with the determination result of step S604, the process waits for convergence of the luminance value (waits until the luminance value settles at a stable level). Then, a convergent luminance Bvl is acquired from image data after the exposure stabilizes (step S605).

Figure 6A:
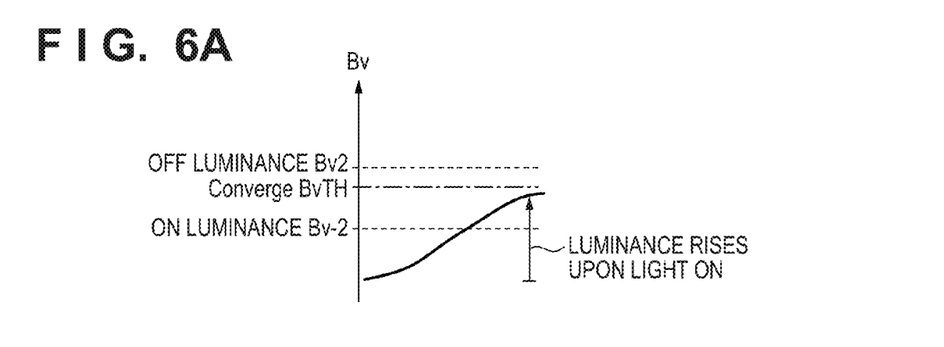
FIGS. 6A to 6C are views showing an operation of increasing the OFF luminance.
Figure 6B:
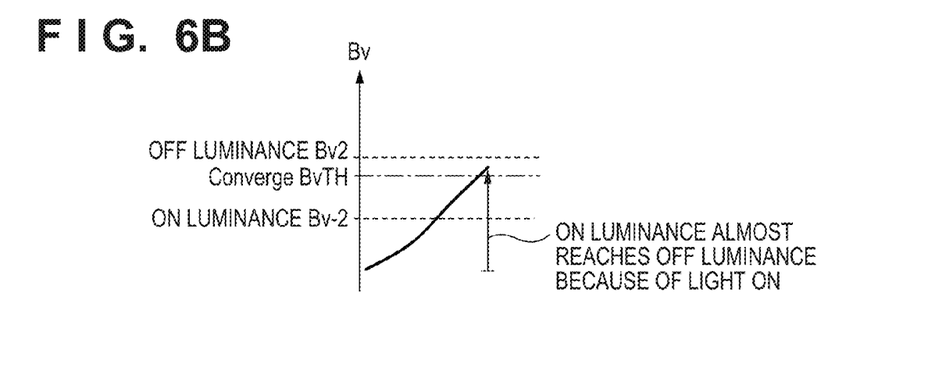
Figure 6C:
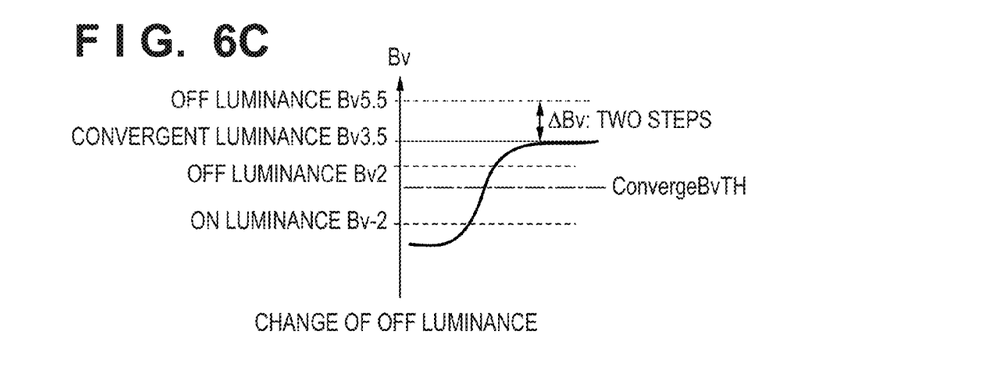
Figure 7A:
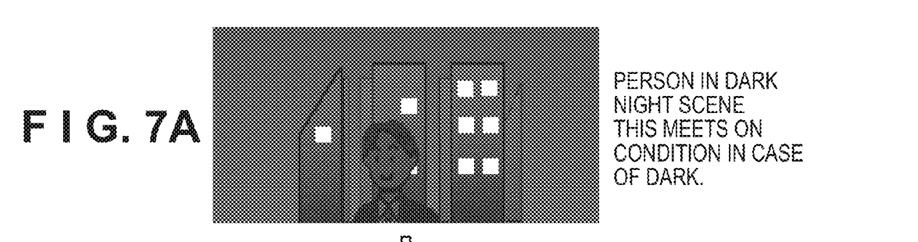
Figure 7B:
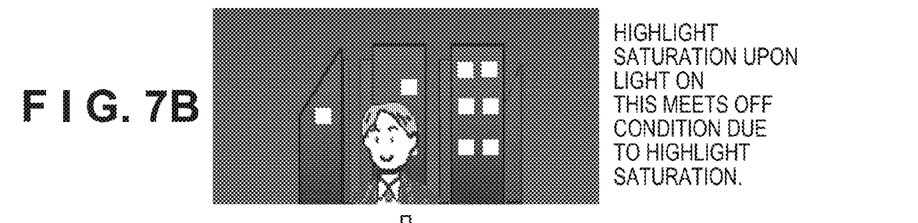
Figure 7C:
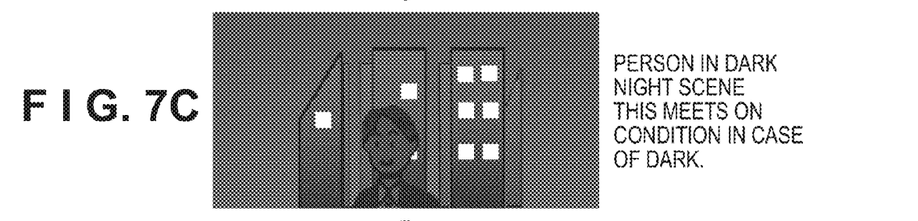
Figure 7D:
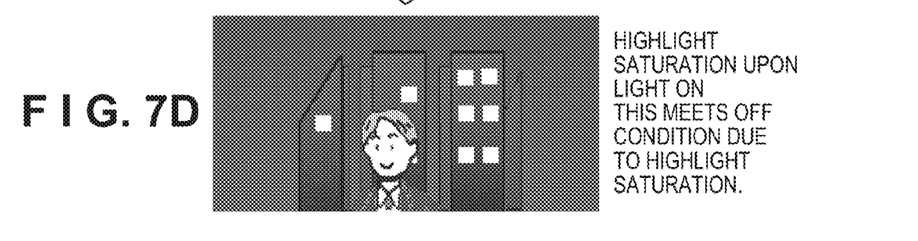

The convergent luminance Bvl is compared with ConvergeBvTH which is a value set as a margin for luminance variations in a scene for a default OFF Bv value (OFF condition) (step S606). If the convergent luminance Bvl is equal to or lower than ConvergeBvTH (FIG. 6A), the OFF Bv value remains default (step S610). If it is determined that the convergent luminance Bvl almost reaches the OFF Bv value (Bvl>ConvergeBvTH: FIG. 6B), the OFF Bv value is set to a value obtained by increasing the convergent luminance by a predetermined luminance, as shown in FIG. 6C (step S607). If the OFF Bv value becomes excessively large upon increasing the OFF Bv value in step S607, the light may not be turned off in a scene in which the operator actually wants to turn off the light. To prevent this, it is determined whether a value Light_OffBv obtained by increasing the convergent luminance by a predetermined luminance exceeds an upper limit value OffBvUpTH (step S608). If Light_OffBv exceeds the upper limit value OffBvUpTH, OffBvUpTH is set as Light_OffBv (step S609).

If it is determined in step S602 that the light is ON, it is determined whether the Bv value is larger than the OFF Bv value (step S612). If the Bv value is equal to or smaller than the OFF Bv value, it is determined to keep the light ON (step S615). If the Bv value is larger than the OFF Bv value, it is determined to turn off the light, and the OFF Bv value is returned to the default value (step S614).

Figure 8A:
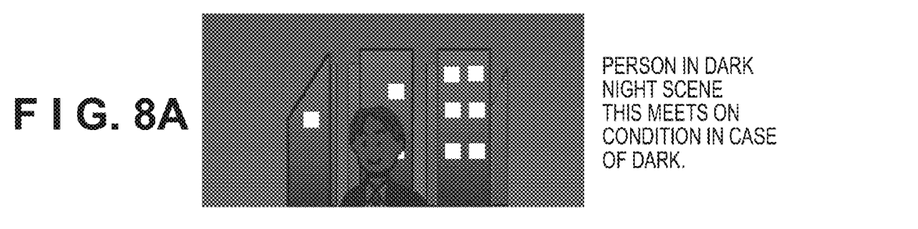
FIGS. 8A to 8C are views showing a hunting prevention effect in the embodiment of the present invention.
Figure 8B:
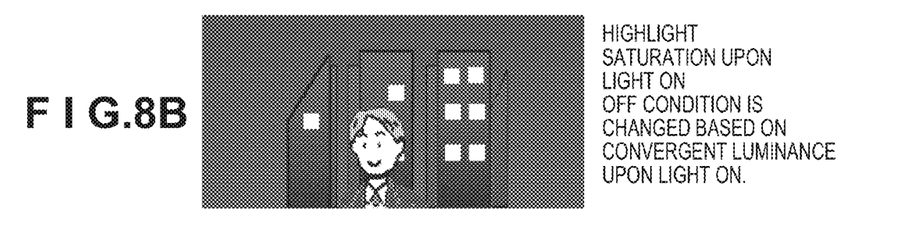
Figure 8C:
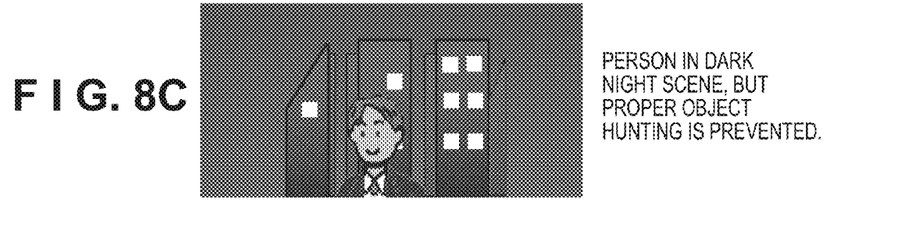

This can suppress hunting in which the object is overexposed upon light ON and the light is turned off again, as shown in FIGS. 7A to 7D. An appropriate light ON operation as shown in FIGS. 8A to 8C can be implemented.

As described above, even if the light is turned on for moving image recording when starting moving image recording with one button from the still image mode, moving image recording starts after exposure variations upon light ON stabilize. Hence, degradation of the moving image quality can be prevented.

The light is turned on after canceling exposure compensation processing. In addition, a luminance value convergence speed immediately after light ON is set higher than a convergence speed during live view. While preventing degradation of the moving image quality, moving image recording can start quickly.

Also, hunting can be prevented by changing the threshold used to determine to turn off the light, in accordance with a change of the object luminance value upon switching the light from the OFF state to the ON state.

In the above embodiment, a case in which the moving image button is pressed in the still image mode has been described. However, the present invention is not limited to the still image mode as long as moving image shooting starts from a state in which exposure compensation is performed during live view.

The light processing unit 106 and light unit 107 may be an external illumination device attachable to the digital camera. Alternatively, the light source of the light unit 107 may be used as that of the electronic flash unit 111.

The control unit 102 may execute processes which are executed by the light processing unit 106 and EF processing unit 110.

When performing exposure compensation during live view before moving image recording, the processing in step S209 may be omitted to change only the convergence speed.

In convergence of the luminance value immediately before the start of moving image recording, the convergence time can be shortened by setting the convergence speed to be higher than a normal speed. However, the convergence speed may not be increased if the luminance value can converge within a satisfactorily short convergence time even at the normal speed.

When exposure variations upon light ON are small even if exposure compensation is performed during live view before moving image recording, that is, the object luminance does not exceed a predetermined value even upon light ON, exposure compensation processing may not be canceled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-197684, filed Sep. 9, 2011, which is hereby incorporated by reference herein in its entirety.

What is claimed is:

1. An image capture apparatus comprising:
an image capture unit which captures an object image;
a compensation unit which performs exposure compensation;
an illumination control unit which controls an illumination device for illuminating an object; and
a control unit which controls the compensation unit and the illumination control unit,
wherein, if turning on the illumination device is required in a case when the compensation unit performs exposure compensation and a display unit sequentially displays images based on image data obtained by continuously capturing images by the image capture unit, the control unit controls the compensation unit to decrease a compensation amount of exposure compensation and thereafter the control unit controls the illumination control unit to turn on the illumination device.

2. The apparatus according to claim 1, wherein, if turning on the illumination device is required in a case when the compensation unit performs exposure compensation and the display unit sequentially displays images based on image data obtained by continuously capturing images by the image capture unit, the control unit controls the compensation unit not to perform exposure compensation and thereafter the control unit controls the illumination control unit to turn on the illumination device.

3. The apparatus according to claim 1, wherein the control unit changes a turning off condition of the illumination device based on image data obtained by image capturing by the image capture unit after the illumination device is turned on.

4. The apparatus according to claim 1, wherein the control unit determines whether to turn on the illumination device based on an object luminance acquired from image data obtained by image capturing by the image capture unit, and
wherein the control unit changes a turning off condition of the illumination device based on an object luminance acquired from image data obtained by image capturing by the image capture unit after the illumination device is turned on.

5. The apparatus according to claim 4, further comprising a moving image recording unit which performs moving image recording based on image data obtained by image capturing by the image capture unit,
wherein the control unit determines whether to turn on the illumination device before a start of moving image recording by the moving image recording unit.

6. The apparatus according to claim 5, wherein, when the illumination device is turned on along with a start of moving image recording by the moving image recording unit, the control unit controls to perform exposure control after the illumination device is turned on and then starts moving image recording by the moving image recording unit.

7. The apparatus according to claim 1, further comprising a moving image recording unit which performs moving image recording based on image data obtained by image capturing by the image capture unit,
wherein the control unit controls to start moving image recording by the moving image recording unit after the illumination device is turned on.

8. A method of controlling an image capture apparatus including an image capture unit which captures an object image, a compensation unit which performs exposure compensation, and an illumination control unit which controls an illumination device for illuminating an object, comprising:
if turning on the illumination device is required in a case when the compensation unit performs exposure compensation and a display unit sequentially displays images based on image data obtained by continuously capturing images by the image capture unit, controlling the compensation unit to decrease a compensation amount of exposure compensation by the compensation unit and thereafter controlling the illumination control unit to turn on the illumination device.

9. An image capture apparatus comprising:
an image capture unit which captures an object image;
an exposure control unit which controls exposure using an exposure compensation value;
an illumination control unit which controls an illumination device for illuminating an object; and
a control unit which controls the exposure control unit and the illumination control unit,
wherein, if turning on the illumination device is required in a case when the exposure control unit performs exposure compensation and a display unit sequentially displays images based on image data obtained by continuously capturing images by the image capture unit, the control unit controls the exposure control unit to control exposure without using an exposure compensation value which is acquired when the illumination device is turned off and thereafter the control unit controls the illumination control unit so as to turn on the illumination device.

10. The apparatus according to claim 9, wherein in a case when the illumination device is turned on, the control unit controls the exposure control unit so as to control exposure using an exposure compensation value which is acquired when the illumination device is turned on.

11. The apparatus according to claim 10, wherein in a case when the display unit sequentially displays images based on image data obtained by continuously capturing images by the image capture unit, the exposure control unit controls exposure at a first speed, and
wherein in a case when the illumination device is turned on, the exposure control unit controls exposure at a second speed which is faster than the first speed.

12. A method of controlling an image capture apparatus including an image capture unit which captures an object image, an exposure control unit which controls exposure using an exposure compensation value, and an illumination control unit which controls an illumination device for illuminating an object, comprising:
if turning on the illumination device is required in a case when the exposure control unit performs exposure compensation and a display unit sequentially displays images based on image data obtained by continuously capturing images by the image capture unit, controlling the exposure control unit to control exposure without using an exposure compensation value which is acquired when the illumination device is turned off and thereafter controlling the illumination control unit so as to turn on the illumination device.

13. The apparatus according to claim 7,
wherein the control unit controls to perform exposure control after the illumination device is turned on and then start moving image recording by the moving image recording unit.

\* \* \* \* \*